United States Patent
Gulden et al.

(10) Patent No.: US 6,810,342 B1
(45) Date of Patent: Oct. 26, 2004

(54) METHOD FOR THE NOISE-FREE EVALUATION OF RADAR SIGNALS

(75) Inventors: Peter Gulden, München (DE); Patric Heide, Neubiberg (DE); Eckhard Storck, Munich (DE); Martin Vossiek, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/979,726
(22) PCT Filed: May 4, 2000
(86) PCT No.: PCT/DE00/01407
  § 371 (c)(1),
  (2), (4) Date: Feb. 7, 2002
(87) PCT Pub. No.: WO00/73747
  PCT Pub. Date: Dec. 7, 2000

(30) Foreign Application Priority Data

Jun. 1, 1999 (DE) .......................... 199 25 216

(51) Int. Cl.⁷ ................................ G06F 19/00
(52) U.S. Cl. ......................... 702/76; 342/195
(58) Field of Search .................. 702/76; 342/195, 342/20; 375/346, 164, 120, 200

(56) References Cited

U.S. PATENT DOCUMENTS 5,479,440 A * 12/1995 Esfahani ................. 375/346
6,469,662 B2 * 10/2002 Tullsson ................. 342/195

FOREIGN PATENT DOCUMENTS

DE          4327333 A1 * 2/1995 ........... G01F/23/28

* cited by examiner

Primary Examiner—John Barlow
Assistant Examiner—Xiuqin Sun
(74) Attorney, Agent, or Firm—Staas & Halsey LLP

(57) ABSTRACT

According to the invention a reference measurement is carried out without or with only one measurement object and the frequencies of the noise fraction are determined for the resulting frequency spectrum. Discrete measurement values are determined at equidistant sampling points in the form of complex-value overlays of oscillation functions and the noise and useful frequencies and by means of mathematical calculation methods corrected by the noise fractions. The measurement values corrected in this way are then subjected to a known method of frequency analysis.

10 Claims, 1 Drawing Sheet

METHOD FOR THE NOISE-FREE EVALUATION OF RADAR SIGNALS

CROSS REFERENCE TO RELATED APPLICATIONS

This application is based on and hereby claims priority to German Application No. 199 25 216.5 filed on 1 Jun. 1999 in Germany, and PCT Application No. PCT/DE00/01407 filed on 4 May 2000, the contents of which are hereby incorporated by reference.

BACKGROUND OF THE INVENTION

The invention relates to the analysis of frequency spectra of a frequency modulated continuous wave ("FMCW") microwave radar system, in which there is at least one virtually constant interference frequency.

In FMCW radar systems which are used, for example, as distance sensors, the parameters of the range and speed of a measurement object are obtained by analysis of the frequencies contained in a radar signal. All known frequency analysis methods (for example, that described in WO99/10757) have limited resolution, however, by virtue of the system. This creates a critical difficulty in determining a frequency in the immediate vicinity of another frequency.

FMCW signals often contain not only the desired useful frequencies $f_N$ which are caused by reflections on measurement objects in the measurement area, but also undesirable systematic interference components at virtually constant frequencies $f_S$, which create a critical difficulty in determining $f_N$ in their immediate vicinity. It is therefore necessary to attempt to suppress these interference components effectively.

A method for suppressing systematic interference frequencies is described in S. V. Vaseghi: "Advanced Signal Processing and Digital Noise Suppression", Wiley Teubner, Chichester 1994. This method assumes that the frequencies, amplitudes and phases of the interference components vary from one measurement to the next. DE 43 32 071 A1 describes a method in which the interference signal reflected on the antenna is compared with a previously recorded signal profile, in order to detect offsets occurring at the antenna. This method assumes that the frequencies, amplitudes and phases of the interference components vary only due to external influences, such as antenna offsets.

The interference components in FMCW signals may be caused by internal reflections in the electronics and on the antenna, or by external reflections, for example on the bottoms of containers, and on container struts. Irrespective of the particular measurement process, they actually have virtually constant, a-priori known frequencies $f_s$, which can either be measured or can be calculated from the geometry of the radar sensor. The associated amplitudes and phases, in contrast, fluctuate severely, for example due to drift in the radar electronics, which changes the radar mid-frequency, and are therefore a-priori unknown.

SUMMARY OF THE INVENTION

One potential object of the present invention is to specify a method for evaluation of a measurement signal of an FMCW radar system by which systematic interference due to fixed-position reflectors, which cause internal or external reflections, can be effectively eliminated.

The method according is based on evaluation of the radar signal by frequency spectrum analysis. The interference frequencies which are present in the spectrum and result from interference reflections are eliminated by specific mathematical methods. For this purpose, a reference measurement is first of all carried out which, depending on the nature of the interference frequencies to be eliminated, is carried out without or with only one measurement object as the reflection target. The frequency spectrum resulting from the reference measurement is preferably analyzed with a greater frequency resolution than is used in normal measurement operation of the apparatus. The frequencies of the interference components in the radar signal are determined in this way. The method may be based on an adaptive least-squares-fit determination, matched to the individual measurement signal, of the interference amplitudes and phases for the known interference frequencies. The interference signal, adapted from one measurement to the next, is thus calculated and is subtracted from the FMCW measurement signal. The FMCW measurement signal that has been cleaned up in this way is then subjected to one of the known frequency analysis methods. Another possibility for determining the interference components is to reconstruct them mathematically, on the basis of the system design.

Discrete values relating to the measurement signals are determined at a predetermined number of sampling points, which are offset by the same time interval with respect to one another. The values detected in this way are recorded as complex-value superimpositions of oscillation functions at the interference and useful frequencies, and have the interference components removed from them by mathematical computation methods. The measured values that have been cleaned up in this way are then subjected to one of the known frequency analysis methods.

BRIEF DESCRIPTION OF THE DRAWING

The following text contains a more detailed description of examples of the method according to the invention with reference to the attached FIGURE, which shows one layout of a microwave radar system.

DETAILED DESCRIPTION OF THE PREFERRED EMBODIMENT

Figure 1:
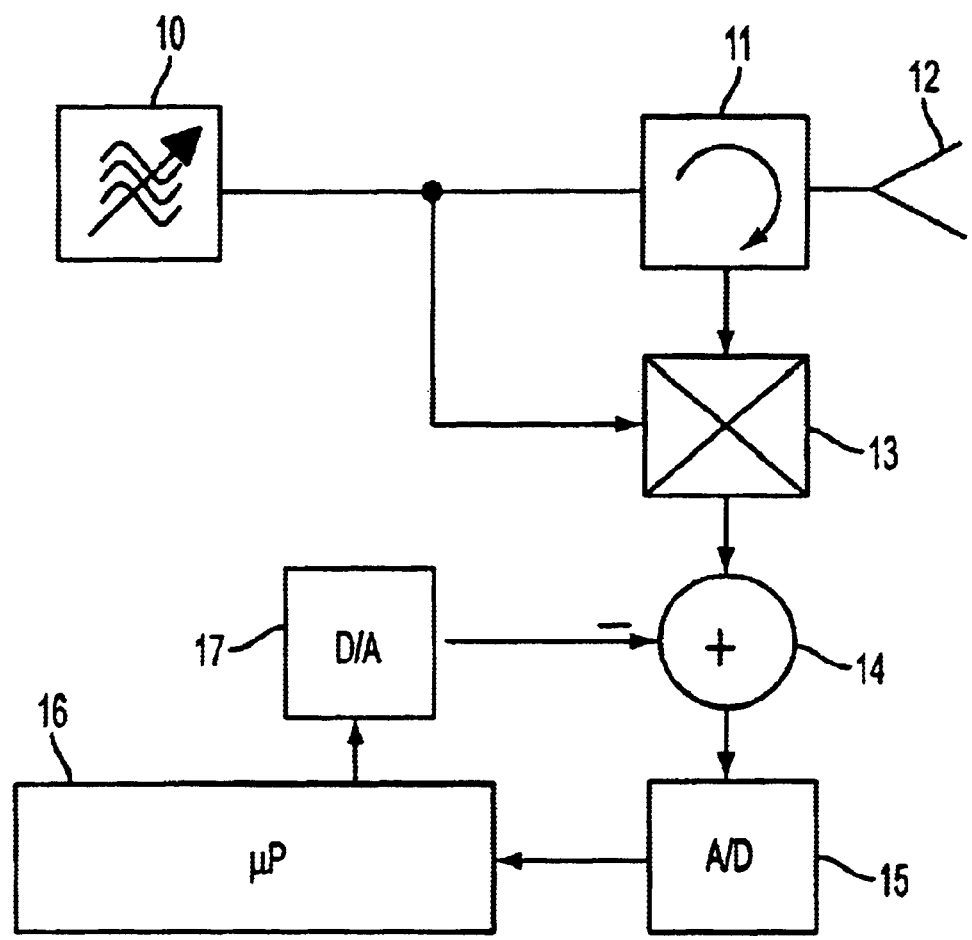

Reference will now be made in detail to the preferred embodiments of the present invention, examples of which are illustrated in the accompanying drawings, wherein like reference numerals refer to like elements throughout.

The FIGURE shows a monostatic FMCW radar system, in which the signal source is a tunable oscillator 10 (VCO). The signal frequency is preferably swept linearly from a lowest value to a highest value, or vice versa. The signal passes through a transmitting/receiving duplexer 11, which, for example, can be formed by a circulator or directional coupler, and is passed to the antenna 12. The transmitting/receiving duplexer 11 is provided to separate the transmitted signal from the received signal. The received signal is supplied to a mixer 13, in which it is mixed with the transmitted signal for demodulation purposes. The downmixed signal is then supplied to the evaluation unit 16, preferably after filtering, which is not shown, to eliminate high-frequency interference components. The calculation steps which characterize the method are described in detail further below and are also carried out in the evaluation unit. Two signals are subtracted in one of these methods. The subtraction process can then either be carried out directly, digitally in the evaluation unit, or in analog form by the adder 14. In the case of analog subtraction, the modulated received signal first of all passes through this adder and is preferably digitized by an A/D converter 15, so that it can be evaluated in an evaluation unit 16 formed by a microprocessor (μP). The values which represent the interference signals and are intended to be subtracted from the demodulated received signal are converted, for example by a D/A converter 17, to an analog signal which is supplied, inverted (in its negative form), to the adder 14.

In the method according to the invention, a reference measurement is carried out first of all. This reference measurement is used to determine the frequencies, which are assumed to be virtually constant, of the interference reflections. When recording the reference measurement, the occurrence of useful frequencies in the direct immediate vicinity of the interference frequencies is avoided. If the radar system is used, for example, as a level measurement device, interference frequencies which occur can also be caused by reflections, which do not vary with time, on the tank fittings in the container. In this case, measurements are carried out in the empty container, without any filling level in it. The accuracy of the reference measurements can be increased by averaging over a number of measurements, by using filters or else by measurement using an FMCW measurement bandwidth which is wider than that for normal operation. During subsequent, normal measurement operation, the associated complex amplitudes of the interference signal terms in the measurement signal are then determined on the basis of the knowledge of these interference frequencies, the associated complex amplitudes of the interference signal terms in the measurement signal. This is preferably done by using linear algebra methods to apply a method for minimizing the square of the error of the solution of an overdefined equation system (least-squares-fit) to a linear transformation of a measurement signal sampled at equal intervals.

The analog radar signal is sampled at N sampling points, which are offset by the same time interval with respect to one another, so that this results in N discrete values, which form the components of a vector, in chronological sequence. The N components x(n), n=1, 2, 3, ..., N−1, N, are written, in complex notation, as a superimposition of p exponential terms with white noise:

$$x(n) = \sum_{k=1}^{p} C_k e^{i\omega_k n} = \omega(n).$$

In this case, k is a numbering for the various frequencies $\omega_k$ that occur, with the complex amplitudes $c_k$. The summation extends over all p frequencies contained in the signal. Since the interference frequencies are known from the reference measurement, the complex amplitudes of the interference components can be determined using approximate linear algebra methods in the spectrum of the measurement signal, such that the interference components can very largely be eliminated. This determination of the complex amplitudes using the least-squares principle (least error-squares method, that is to say the minimum sum of the squares of the errors) has considerably higher resolution than the frequency estimation methods, that is to say interference components are still determined correctly even if there are very closely adjacent useful frequencies.

The matrix F is preferably formed in order to determine the complex amplitudes contained in the normal measurement signal, in which matrix F the number p of rows corresponds to the number of interference frequencies present, and which matrix has the same number of columns as the number of sampled measured values. Each point in the matrix contains the exponential function of the product of i=√−1, the column number and the respective interference frequency associated with a row. This element is thus in the form $e^{i\omega_k n}$ where k is the number of the interference frequency and the number of the row in the matrix, and n is the number of the column with a value from 1 to N:

$$F = \begin{bmatrix} e^{i\omega_1 1} & e^{i\omega_1 2} & \ldots & e^{i\omega_1 N} \\ e^{i\omega_2 1} & \ldots & & \vdots \\ \vdots & & \ldots & \vdots \\ e^{i\omega_p 1} & \ldots & \ldots & e^{i\omega_p N} \end{bmatrix}$$

The vector of the measured signal is multiplied by the pseudo-inversive of the above matrix, which can be determined by applying a least-squares method for determining the solution of an overdefined linear equation system to the previously specified matrix. This results in the complex amplitudes Ck associated with the exponential functions of the interference frequencies, where k now represents the sequential numbering of the interference frequencies. The interference component which has been approximated by calculating the associated complex amplitudes can then be subtracted from the components of the vector of the measurement signal. This thus results in the vector, from which the systematic interference component has been removed, of the values of the measurement signal at equal time intervals. Conventional frequency analysis methods can then be applied to this. In particular in the case of measurements with FMCW radar sensors in the near area, this method leads to an improvement in the measurement accuracy. Furthermore, this method is not sensitive to drift in the electronics or to interference from closely adjacent frequencies.

The invention has been described in detail with particular reference to preferred embodiments thereof and examples, but it will be understood that variations and modifications can be effected within the spirit and scope of the invention.

What is claimed is:

1. A method for elimination of interference components at constant frequencies in a frequency spectrum of a frequency modulated continuous wave radar system, comprising:

performing a reference measurement of interference signals, in which the occurrence of useful signals is avoided, determining a spectrum of interference frequencies from this reference measurement, measuring a useful signal to produce a measurement signal, sampling the measurement signal at each of a predetermined number of sampling points which are offset by the same time interval with respect to one another, using the interference frequencies of the frequency spectrum to determine, from the sampled measurement signal, complex amplitudes which approximate the proportion of the frequency spectrum of the sampled measurement signals caused by the interference frequencies, and subtracting the frequency spectrum caused by interference frequencies from the sampled measurement signal to form a difference signal, wherein in determining the complex amplitudes, a vector which contains samples of the measurement signal in a chronological sequence as components is transformed by a matrix, which represents a pseudo-inverse, which is formed by a least-squares method for minimizing the square of the error of the solution of an overdefined linear equation system, the matrix has a number of rows corresponding to the number of interference frequencies, the matrix has a number of columns corresponding to the number of sampling points, and elements in each row of the matrix are exponential functions of a respective interference frequency multiplied by the square root of −1 and the column number.

2. A method as claimed in claim 1, wherein the reference measurement is performed by passing a reference signal through a median so that it does not reflect off an object whose properties are to be measured.

3. A method as claimed in claim 2, wherein the useful signal is measured by obtaining returned radar signals with an intended target present.

4. A method as claimed in claim 1, wherein the useful signal is measured by obtaining returned radar signals with an intended target present.

5. A device to eliminate interference components at constant frequencies in a frequency spectrum of a frequency modulated continuous wave radar system, comprising:

a first measurement unit to perform a reference measurement of interference signals, in which the occurrence of useful signals is avoided;

a spectrum unit to determine a spectrum of interference frequencies from this reference measurement;

a second measurement unit to measure a useful signal to produce a measurement signal;

a sampling unit to sample the measurement signal at each of a predetermined number of sampling points which are offset by the same time interval with respect to one another;

an amplitude determination unit to use the interference frequencies of the frequency spectrum to determine, from the sampled measurement signal, complex amplitudes which approximate the proportion of the frequency spectrum of the sampled measurement signals caused by the interference frequencies; and a subtraction unit to subtract the frequency spectrum caused by interference frequencies from the sampled measurement signal to form a difference signal, wherein in determining the complex amplitudes, a vector which contains samples of the measurement signal in a chronological sequence as components is transformed by a matrix, which represents a pseudo-inverse, which is formed by a least-squares method for minimizing the square of the error of the solution of an overdefined linear equation system, the matrix has a number of rows corresponding to the number of interference frequencies, the matrix has a number of columns corresponding to the number of sampling points, and elements in each row of the matrix are exponential functions of a respective interference frequency multiplied by the square root of −1 and the column number.

6. A method for elimination of interference components at constant frequencies in a frequency spectrum of a frequency modulated continuous wave radar system, comprising:

performing a reference measurement of interference signals, in which the occurrence of useful signals is avoided, determining a spectrum of interference frequencies from this reference measurement, measuring a useful signal to produce a measurement signal, sampling the measurement signal at each of a predetermined number of sampling points which are offset by the same time interval with respect to one another, using the interference frequencies of the frequency spectrum to determine, from the sampled measurement signal, complex amplitudes which approximate the proportion of the frequency spectrum of the sampled measurement signals caused by the interference frequencies, and subtracting the frequency spectrum caused by interference frequencies from the sampled measurement signal to form a difference signal, wherein the reference measurement is performed by passing a reference signal through a median so that it does not reflect off an object whose properties are to be measured.

7. The method as claimed in claim 6, wherein in determining the complex amplitudes, a vector which contains samples of the measurement signal in a chronological sequence as components is transformed by a matrix, which represents a pseudo-inverse, which is formed by a least-squares method for minimizing the square of the error of the solution of an overdefined linear equation system, the matrix has a number of rows corresponding to the number of interference frequencies, the matrix has a number of columns corresponding to the number of sampling points, and elements in each row of the matrix are exponential functions of a respective interference frequency multiplied by the square root of −1 and the column number.

8. A method as claimed in claim 6, wherein the useful signal is measured by obtaining returned radar signals with an intended target present.

9. A method as claimed in claim 6, wherein the useful signal is measured by obtaining returned radar signals with an intended target present.

10. A device to eliminate interference components at constant frequencies in a frequency spectrum of a frequency modulated continuous wave radar system, comprising:

a first measurement unit to perform a reference measurement of interference signals, in which the occurrence of useful signals is avoided;

a spectrum unit to determine a spectrum of interference frequencies from this reference measurement;

a second measurement unit to measure a useful signal to produce a measurement signal;

a sampling unit to sample the measurement signal at each of a predetermined number of sampling points which are offset by the same time interval with respect to one another;

an amplitude determination unit to use the interference frequencies of the frequency spectrum to determine, from the sampled measurement signal, complex amplitudes which approximate the proportion of the frequency spectrum of the sampled measurement signals caused by the interference frequencies; and a subtraction unit to subtract the frequency spectrum caused by interference frequencies from the sampled measurement signal to form a difference signal, wherein the reference measurement is performed by passing a reference signal through a median so that it does not reflect off an object whose properties are to be measured.

* * * * *